United States Patent
Kuehn

(10) Patent No.: US 9,068,585 B2
(45) Date of Patent: Jun. 30, 2015

(54) RETAINING MEANS WITH AN AXIAL PASSAGE FOR RECEIVING A FORMAT PART

(71) Applicant: KRONES AG, Neutraubling (DE)

(72) Inventor: Robert Kuehn, Palling (DE)

(73) Assignee: Krones AG, Neutraubling (DE)

(*) Notice: Subject to any disclaimer, the term of this patent is extended or adjusted under 35 U.S.C. 154(b) by 88 days.

(21) Appl. No.: 13/622,705

(22) Filed: Sep. 19, 2012

(65) Prior Publication Data

US 2013/0071205 A1 Mar. 21, 2013

(30) Foreign Application Priority Data

Sep. 20, 2011 (DE) .................. DE10 2011 053 786

(51) Int. Cl.
*F16B 21/20* (2006.01)

(52) U.S. Cl.
CPC ........... *F16B 21/20* (2013.01); *Y10T 24/44291* (2015.01); *Y10T 24/44017* (2015.01)

(58) Field of Classification Search
USPC .............. 411/525–529, 521; 24/706.3, 706.5, 24/706.8, 707.2, 707.4, 707.5, 706, 707.56
See application file for complete search history.

(56) References Cited

U.S. PATENT DOCUMENTS

| | | | |
|---|---|---|---|
| 716,888 A * | 12/1902 | Hancock | 24/108 |
| 996,791 A * | 7/1911 | Pershall | 24/706.6 |
| 1,020,653 A * | 3/1912 | Mueller | 24/706.6 |
| 1,037,010 A * | 8/1912 | Irons | 292/307 R |
| 1,235,622 A * | 8/1917 | White | 24/706.6 |
| 2,055,166 A * | 9/1936 | Berry | 411/352 |
| 2,321,157 A | 3/1942 | Rees | |
| 2,321,158 A | 6/1943 | Rees | |
| 2,339,664 A * | 1/1944 | Tinnerman | 411/521 |
| 2,568,584 A * | 9/1951 | Hartman | 411/525 |
| 3,182,939 A * | 5/1965 | Alexander | 248/73 |
| 4,104,622 A * | 8/1978 | Van Niel | 340/572.8 |
| 4,318,498 A | 3/1982 | Magers | |
| 5,833,422 A | 11/1998 | Haga | |
| 7,818,940 B2 | 10/2010 | Herb | |
| 2005/0158140 A1 | 7/2005 | Esser | |

FOREIGN PATENT DOCUMENTS

| | | |
|---|---|---|
| CN | 1656322 | 12/2001 |
| DE | 3 600 311 | 9/1986 |
| DE | 3600311 | 9/1986 |
| DE | 10 2007 055 878 | 6/2009 |

(Continued)

*Primary Examiner* — Flemming Saether
(74) *Attorney, Agent, or Firm* — Davidson, Davidson & Kappel, LLC

(57) ABSTRACT

A retainer with an axial passage for receiving a format part is disclosed. The retainer includes several clamping tongues facing in the direction of the format part, the clamping tongues being angularly aligned against an outer lateral surface of the format part and being elastically deformable. The format part is held stationary in a first movement direction by the clamping tongues when its outer lateral surface is contacting the clamping tongues and whereby the format part is movable and/or guidable in a second movement direction, the second movement direction being opposite to the first movement direction. Furthermore the retainer includes at least one adjuster, wherein the surface contact between the respective clamping tongues and the format part is released upon actuation and/or upon a defined alignment of the at least one adjuster.

13 Claims, 2 Drawing Sheets

(56) References Cited

FOREIGN PATENT DOCUMENTS

| EP | 1 150 025 | 10/2001 |
|---|---|---|
| EP | 1150025 | 10/2001 |
| FR | 2 796 426 | 1/2001 |
| FR | 2 823 808 | 10/2002 |

* cited by examiner

RETAINING MEANS WITH AN AXIAL PASSAGE FOR RECEIVING A FORMAT PART

This claims the benefit of German Patent Application DE 10 2011 053 786.4, filed Sep. 20, 2011 and hereby incorporated by reference herein.

The present invention relates to retaining means with an axial passage for receiving a format part.

BACKGROUND

Retaining means for securing against axial displacement are already known from the prior art. For this purpose, e.g. snap rings, nuts, or split discs are used in numerous embodiments thereof. These securing elements require grooves or holes in the shaft. This requires an additional working step during the production of the shaft. Furthermore, clamping discs having a sharp punching burr are known, which can secure smooth shafts or axes axially through this sharp punching burr. Such a clamping disc is disclosed in EP 1 150 025 A1. The clamping disc shown in the EP-application can only be used for a one-sided mounting. A release of the axle or shaft against the insertion direction is not intended. If a release against the insertion direction is required, then the clamping disc needs to be destroyed.

SUMMARY OF THE INVENTION

It is an object of the present invention to provide a retaining means for axially securing format parts, whereby the format part can be released from the retaining means against the insertion direction without a destruction of the retaining means. In addition, the retaining means should be designed as simple as possible and the release of the format part should be easy going and straightforward.

The present invention provides a retaining means with an axial passage for receiving a format part. The format part may contain for example a shaft and/or a bolt. When the format part is received by the retaining means, the shaft and/or bolt is guided through the axial passage of the retaining means. As format parts, for example, structural components or working tools can be used. Thus, for example, the format parts can come from the automotive sector, from the electrical connection technology, from special machinery technology or from toy technology.

The retaining means is provided with several elastically deformable clamping tongues, facing in the direction of the format part. The clamping tongues are angularly aligned against an outer lateral surface of the format part. For example, at least three clamping tongues may be provided, which are arranged radially around the axial passage opening. Furthermore, the clamping tongues can be made, for example, of spring steel. Also other materials with elastic, viscoelastic or hyper elastic properties can be used for the design of the clamping tongues. Furthermore, it is conceivable that composite materials with similar material properties can be selected as suitable material for the clamping tongues.

Further, it is provided that the outer lateral surface of the format part contacting the clamping tongues is held stationary by the clamping tongues in a first movement direction. In a second movement direction, which is opposite to the first movement direction, the format part is movable and/or guidable within the retaining means. When the format part enters the passage of the retaining means, the format part can thus only be guided and/or moved axially and in one movement direction. During the surface contact of the clamping tongues with the outer lateral surface of the format part, preferably a frictional connection between the clamping tongues and the format part occurs. The clamping tongues may have a sharp ridge and/or a sharp edge at their free ends, which serves to retain the respective format part.

According to the invention an adjustment means is provided. Upon actuation and/or upon a defined alignment of the at least one adjustment means the surface contact between the respective clamping tongues and the format part is released. It can be provided, that at a defined alignment of the adjustment means and/or upon actuation of the adjustment means, the adjustment means is engaged with the clamping tongues in such a way, that the clamping tongues are elastically deformed and thus move away from the outer lateral surface of the format part, thereby annihilating the frictional connection between the clamping tongues and the format part.

The defined alignment and/or the actuation of the adjustment means may, for example, be carried out by guiding the adjustment means in the second movement direction or by guiding the adjustment means in the movement direction, in which the format part is movable and/or guidable. For this guided movement, the adjustment means can be used in conjunction with suitable roller bearing and/or sliding-contact bearings. It is also conceivable that snap-lock connections and/or clip-on connections and/or clamping connections are available, which keep the adjustment means in a defined unlockable state and/or which keep the adjustment means in an actuated state.

In a preferred embodiment, the at least one adjustment means is mounted slidable along an axis extending parallel to the outer lateral surface of the format part. Furthermore a reversible elastic deformation and/or a reversible elastic bending of the angularly aligned clamping tongues can be triggered through the actuation and/or through the defined alignment of the at least one adjustment means. Here, the adjustment means can be guided against the clamping tongues, whereby the clamping tongues are pressed away from the outer lateral surface of the format part. Preferably, the adjustment means is simultaneously guided against all clamping tongues and thus simultaneously releases the surface contact between all clamping tongues and the outer lateral surface of the format part.

It is also conceivable that the retaining means comprises an upper base body and a lower base body. The upper base body and the lower base body may be formed as separate components of the retaining means. Further, the upper base body together with the lower base body may form a conical inner space or the upper base body together with the lower base body encloses a conical inner space. The angularly aligned clamping tongues and/or the format part with its outer lateral surface being in surface contact with the clamping tongues are arranged at least partially within this conical inner space. It may be provided that the upper base body comprises an opening which is formed as an outlet opening for the format part. The opening may in this case open into the conical inner space.

In particular, both the upper base body and the lower base body each have a substantially axially disposed opening. The openings of the assembled unit together form a passage opening for the format part, whereby the assembled unit comprises the upper base body, said lower base body and the retaining means.

Also, the clamping tongues may be part of a one-piece component of said retaining means, in particular a clamping disc. For example, the one-piece component may be formed by separating (punching) and two-stage recasting. The one-piece component may be arranged between the upper base body and the lower base body. Further, the upper base body can be fixed via bore holes and in particular screwed to the lower base body and/or the one-piece component can be fixed via bore holes and in particular screwed to the upper base body and/or the lower base body. It is also conceivable that the one-piece component is clamped between the upper base body and lower base body. The bore holes of the one-piece component can hereby be circular and/or they can be arranged radially around the axial passage. It is conceivable that all the bore holes have an equal distance from the axial passage.

Furthermore, it may be provided, that the clamping tongues each include two wide side surface areas on opposite sides, which show a tapered design in the direction of the axial passage.

Also, the clamping tongues may each show a first angular alignment to an axis extending perpendicular to the outer lateral surface of the format part. Furthermore the clamping tongues may each show a second angular alignment, wherein the second angular alignment is closer to the format part and/or closer to the axial passage than the first angular alignment and wherein the second angular alignment is set against or in opposition to the first angular position. The optional second angular alignment has been proven advantageous in practice, because it provides a better rest for the clamping tongues on the format part, thereby improving the surface contact between the clamping tongues and the format part. The first angle is preferentially defined by an angle between 0° and 90°. Particularly in the state where the contact between the clamping tongues and the outer lateral surface of the format part is released, the first angle may be defined by an angle of 45°. In a preferred embodiment of the present invention, the second angular alignment is defined by a smaller angle than the first angular alignment. Preferably, the first angular alignment is set in the direction of the upper base body and the second angular alignment is set in the direction of the lower base body. A first angle is enclosed between the clamping tongue and the axis extending perpendicular to the outer lateral surface of the format part in the area of the first angular alignment. Furthermore a second angle is enclosed between the clamping tongue and the axis extending perpendicular to the outer lateral surface of the format part in the area of the second angular alignment. In this case the first angle may be bigger than the second angle.

Embodiments have proven advantageous in practice, in which the format part is supportable and/or guidable by the at least one adjustment means in a state when the outer lateral surface of the format part is in surface contact with the clamping tongues and upon actuation and/or defined alignment of the at least one adjustment means. For example, the adjustment means may be formed by a hollow cylinder or another geometrical hollow body, the inner space of which forms an inlet opening for receiving the format part. After the format part has entered the inner space, it can rest against an inner lateral surface of the hollow body. In this case, the inlet opening can open into the conical inner space and have the same diameter as the previously mentioned outlet opening of the upper base body. It is conceivable, for example, that the adjustment means is connected via suitable roller bearings and/or sliding bearings and/or further bearings with the lower base body. Also, the adjustment means may have roller bearings and/or sliding bearings and/or further bearings on its side facing the format part.

The retaining means can, for example, be especially shaped for receiving a fastening means comprising an axis and/or bolt. Particularly the retaining means can be shaped for receiving a heating rod. The heating rod may, for example, be part of a heating device for preforms and serve for heating the preforms. If preforms with different geometry each should be heated, it may be necessary to install different heating rods in the heating device, depending on the geometry of the respective preforms. It is therefore necessary to remove the heating rods from the retaining means and to exchange them. The retaining means according to the invention has proven to particularly optimize the time requirement for the changing process and ease the implementation of this changing process. It is further easily imaginable, that further processing stations are arranged downstream of the heating device, for example a blow molding station. Such a construction comprising a heating device and a blow molding station could, for example, be used advantageously in a blow molding machine or a stretch blow molding machine.

Furthermore it may be provided, that format parts can also be secured releasable with this retaining means. Especially format parts having an outer peripheral surface with a semi-circular and/or polygonal shape can be secured releasable with this retaining means. In this case, the geometry of the clamping tongues has to be designed in such a manner, that they are suitable for the stationary holding of the format part. It is conceivable that the free ends of the clamping tongues are shaped form-locking to the outer lateral surface of the format part. The geometry of the format part can show both concave and convex shapes.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

DETAILED DESCRIPTION

Figure 1:
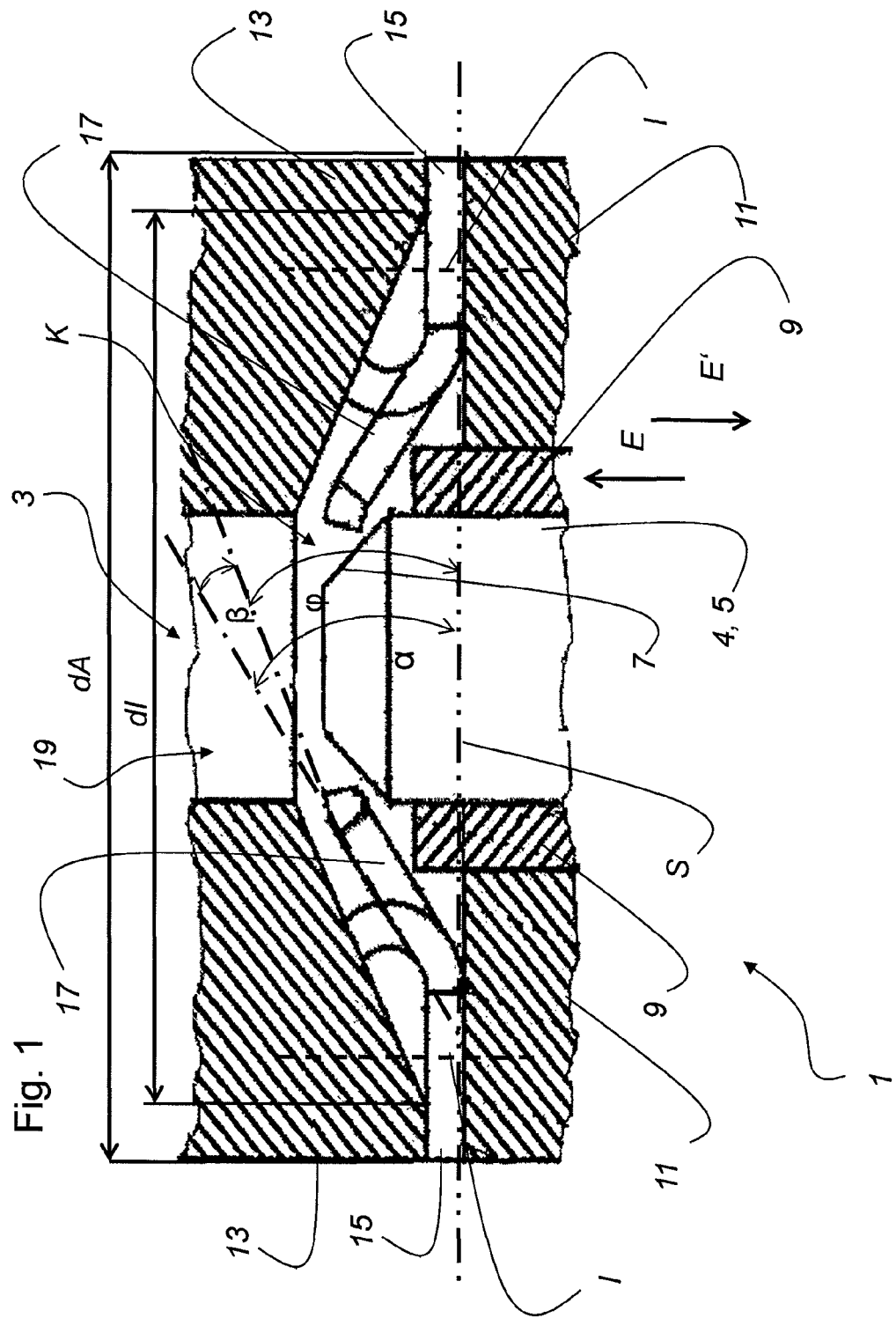
FIG. 1 shows a schematic cross section through an embodiment of the retaining means according to the invention.

The same or equivalent elements of the invention are designated by identical reference characters. Furthermore and for the sake of clarity, only the reference characters relevant for describing the respective figure are provided. It should be understood that the embodiments described are only examples and they are not intended to limit the scope of the disclosure.

FIG. 1 shows a schematic cross section through an embodiment of the retaining means or retainer 1 according to the invention. The retaining means 1 has an axial passage 3 for receiving a format part 4. The format part 4 shown in this embodiment is a heating rod 5. At its free end the heating rod 5 is provided with a bezel 7. The heating rod 5 is guided in a movement direction E by an adjustment means or adjuster 9. In the depicted embodiment the adjustment means 9 is formed as a hollow cylinder. The surface of the adjustment means 9 is contacting the surface of the format part 4 or the heating rod 5. Furthermore, the adjustment means 9 is displaceable in a movement direction E. Furthermore, the adjustment means 9 is displaceable in a movement direction E', the movement direction E' being contrary to the movement direction E. The adjustment means 9 is slidable mounted on a lower base body 11. A clamping disc 15 (shown in detail in FIG. 2) with clamping tongues 17 is located between the lower base body 11 and an upper base body 13. The clamping disc 15 comprises bore holes 21 (see FIG. 2), the possible position of which is indicated by the dashed lines I. The clamping disc 15 is fixed to the upper base body 13 and to the lower base body 11 via the bore holes 21 by a screw connection. As can further be seen in FIG. 1, the clamping tongues 17 are set in an angle against an outer lateral surface of the format part 4 or against an outer lateral surface of the heating rod 5. In respect to an axis S, which is extending vertical to the outer lateral surface of the format part 4, the clamping tongues 17 show a first angular alignment α as well as a second angular alignment β. The second angular alignment β is closer to the format part 4. The second angular alignment β is set in opposition to or against the angular alignment α. The first angular alignment α is set in the direction of the upper base body 13. The second angular alignment β is set in the direction of the lower base body 11. In the illustrated embodiment the angle α is 45°. In the region of the second angular alignment β the clamping tongue 17 is set at an angle ϕ against the axis S, the axis S extending parallel to the outer lateral surface of the format part 4. In this case the angle ϕ is smaller than the angle αThe following applies: α=ϕ+β. In FIG. 1 the adjustment means 9 is not in an actuated state, therefore the adjustment means 9 is not in contact with the clamping tongues 17. The upper base body 13 and the lower base body 11 together form a conical inner space K, within which the clamping tongues 17 are arranged. The upper base body 13 furthermore comprises an outlet opening 19, through which the format part 4 or the heating rod 5 can be guided. After the format part 4 or the heating rod 5 has entered through the outlet opening 19, its surface contacts the clamping tongues 17. In this case the clamping tongues 17 are lying on the outer lateral surface of the format part 4, thereby creating a frictional connection between the clamping tongues 17 and the format part 4. This prevents a movement of the format part 4 in movement direction E', which is opposite to the movement direction E. Instead a movement of the format part 4 in movement direction E is still possible. To return the format part 4 against the moving direction E, which is opposite to the moving direction E, the adjustment means 9 is actuated or guided against the clamping tongues 17. Because of their elastic properties, the clamping tongues 17 move away from the format part 4, thereby enlarging the angle α. Thereby the frictional connection between the clamping tongues 17 and the format part 4 is annihilated.

The format part 4 can now be removed from the retaining means 1 by a movement opposite to the movement direction E. If the adjustment means 9 is moved in a counter movement direction to the movement direction E, it loses its contact with the clamping tongues 17. Due to their elastic material properties, the clamping tongues 17 are reversibly back deformed and assume the position shown in FIG. 1. It can also be seen that the upper base body 13 has an outer diameter dA and an inner diameter dI. A contact disc 17 is clamped between the upper base body 13 and the lower base body 11 in the region between the inner diameter dI and the outer diameter dA.

Figure 2:
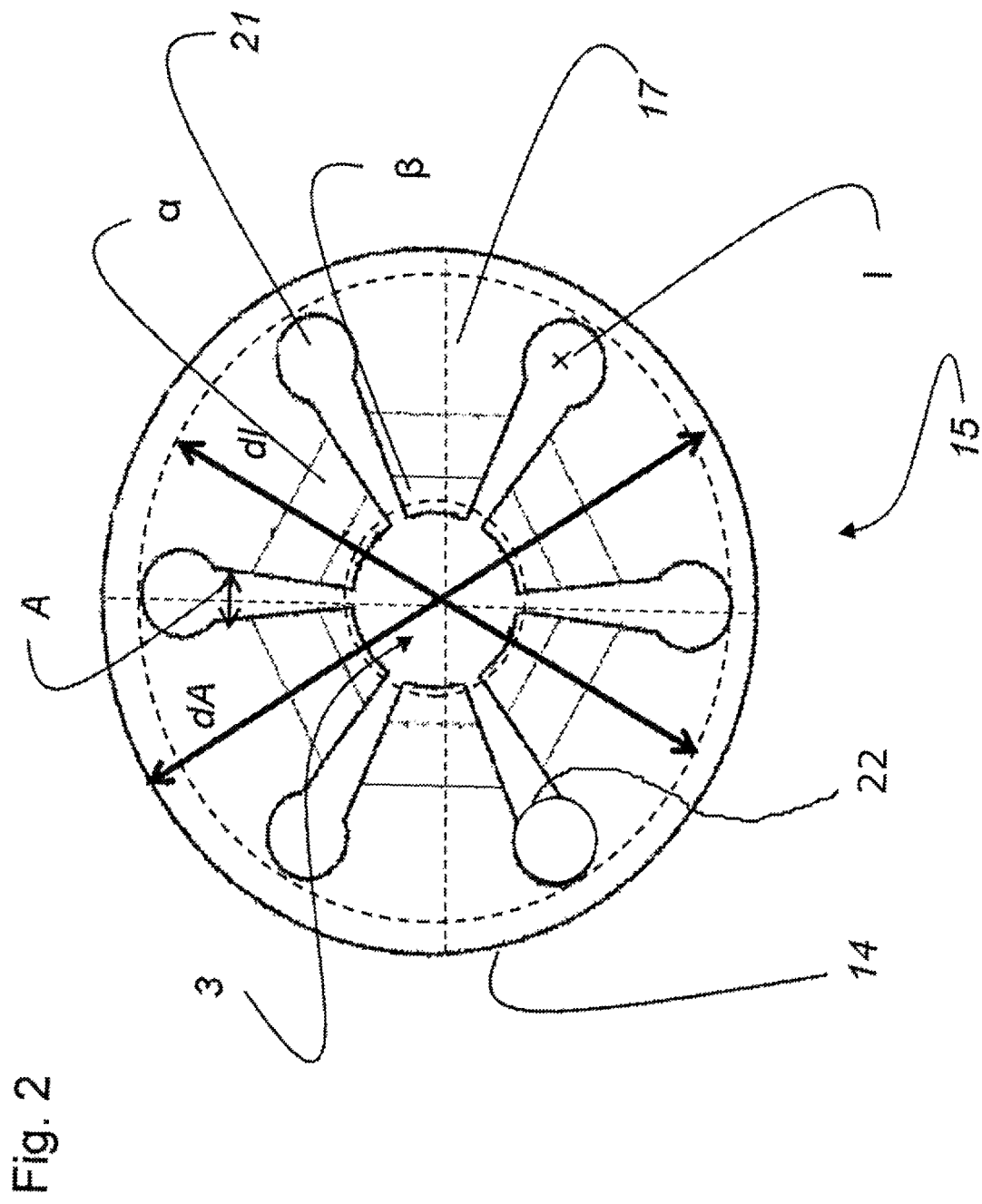
FIG. 2 shows a schematic top view of an embodiment of a clamping disc, which can be part of the retaining means according to the invention.

FIG. 2 shows a schematic top view of a clamping disc 15, which can be part of an embodiment of a retaining means 1 according to the invention. It shows the outer diameter dA and the inner diameter dI, which have been described in FIG. 1. According to the embodiment shown in FIG. 2, the clamping disc 15 has a circular design. The clamping tongues 17 are arranged around the axial passage 3 and form an inlet opening for a format part 4, the format part 4 having a cylindrical outer lateral surface. The bore holes 21 through which screws 22 pass to form a screw connection (shown schematically) are arranged radially around the axial passage 3. As can be seen in FIG. 2, the shape of the wide sides of the clamping tongues 17 show a tapering in the direction of the axial passage 3. The design of the tapering is such, that the lateral distance A of a clamping tongue 17 to its adjacent clamping tongues 17 is constantly reduced in the direction of the axial passage 3.

The invention has been described with reference to preferred embodiments. To the expert it is also conceivable, however, to make changes and modifications without leaving the scope of protection of the appended claims.

LIST OF REFERENCE NUMBERS:

1 retaining means or retainer
3 axial passage
4 format part
5 heating rod
7 Bezel
9 adjustment means or adjuster
11 upper base body
13 lower base body
15 clamping disc
17 clamping tongues
19 outlet opening
21 bore hole
22 screw
A Distance
dA outer diameter
dI inner diameter
E movement direction
E' opposite movement direction/counter movement direction
I axis (bore holes)
K conical inner space
S vertical axis
αfirst angular alignment
βsecond angular alignment
ϕangle

What is claimed is:

1. A retainer with an axial passage for receiving a format part comprising:
    several clamping tongues facing in the direction of the format part, the clamping tongues being elastically deformable, the clamping tongues angularly aligned against an outer lateral surface of the format part to hold the format part stationary in a first movement direction, the format part being movable in a second movement direction opposite to the first movement direction;
    at least one adjuster, contact between the respective clamping tongues and the format part being released upon movement of the adjuster in the second movement direction, the format part as a result being movable in the first movement direction for removal; and
    an upper base body and a lower base body, together forming a conical inner space, within which the angularly aligned clamping tongues or the format part are at least partially arranged when the outer lateral surface of the format part is in contact with the clamping tongues, the clamping tongues being part of a one-piece component of the retainer, the one piece component arranged between the upper base body and the lower base body, the upper base body being fixable via bore holes to the lower base body or the one-piece component being fixable via bore holes to the upper base body or to the lower base body, the one piece component being fixable via the bore holes by a screw connection.

2. The retainer as recited in claim 1 wherein the at least one adjuster is slidably mounted along an axis, the axis extending parallel to an outer lateral surface of the format part, and the movement of the adjuster in the second movement direction causes a reversible deformation of the clamping tongues to release the format part.

3. The retainer as recited in claim 1 wherein the one piece component is a clamping disc.

4. The retainer as recited in claim 1 wherein the bore holes of the one-piece component are arranged radially around the axial passage.

5. The retainer as recited in claim 1 wherein the clamping tongues each have two wide side surface areas on opposite sides, tapering in the direction of the axial passage.

6. The retainer as recited in claim 1 wherein the clamping tongues each have a first angular alignment with respect to an axis extending perpendicular to the outer lateral surface of the format part, the clamping tongues each having a second angular alignment with respect to the first axial alignment closer to the axial passage than the first angular alignment.

7. The retainer as recited in claim 6 wherein the first angular alignment is defined by an angle between 0° and 90°.

8. The retainer as recited in claim 7 wherein the first angular alignment is defined by an angle of at least about 45° in a state with no contact between the clamping tongues and the format part.

9. The retainer as recited in claim 1 wherein the format part is supportable or guidable by the at least one adjuster in the state with surface contact of the outer lateral surface of the format part with the clamping tongues and upon movement the at least one adjuster in the second movement direction.

10. The retainer as recited in claim 9 wherein the retainer is designed for receiving a format part with an axis or a bolt.

11. The retainer as recited in claim 10 wherein the retainer is designed for receiving a heating rod in a heating device.

12. The retainer as recited in claim 1 wherein the retainer is designed for receiving a structural component or a working tool.

13. The retainer as recited in claim 1 wherein the retainer is designed for receiving a heating rod in a heating device for preforms.

* * * * *